Patented Nov. 14, 1933

1,934,810

UNITED STATES PATENT OFFICE 1,934,810

PROCESS OF CANNING APPLE PRODUCTS

Lincoln Charles Mazzola, Rochester, N. Y.

No Drawing. Application May 7, 1930
Serial No. 450,592

2 Claims. (Cl. 99—11)

The present invention relates to the process of canning apple products such as sliced apples and apple sauce and an object thereof is to obtain apple products which will have the apple flavor substantially maintained notwithstanding the fact that during canning the fruit is subjected to water baths which have heretofore tended to remove soluble matters from the fruit and fill the cells with the liquid of the bath. Another object of this invention is to provide for improving the taste of apple products by introducing into some or all liquids used in the canning process, apple juice so as to render the liquid less liable to dissolve the soluble contents of the fruit as well as to fill the fruit cells with a liquid which shall approach the apple flavor. Still another object of the invention is to improve the flavor of canned apple products by introducing apple juice into the brine or salt bath. A further object of the invention is to improve the flavor of canned apple products by introducing apple juice into the warming, heating or cooking baths. Still another object of the invention is to provide for improving the flavor of canned apples by introducing hot apple juice into the can of apples just prior to sealing.

To these and other ends, the invention consists in the steps in the process of canning canned apple products as well as a combination of steps as set forth hereinafter and particularly pointed out in the claims.

The invention will be described in connection with a process of canning sliced apples but it is apparent that certain steps thereof are capable of use in connection with the canning of any apple products, as for instance, apple sauce.

The apples are preferably pared and trimmed and then cut up into small pieces such as slices. The pieces or slices are for the purpose of holding the color of the fruit and for toughening the same, then subjected to a salt bath for a suitable period, say fifteen minutes or more depending on the condition and variety of the apples as well as other factors.

The salt bath may be of any desired strength say from 3 to 10 per cent. This salt bath may be made from pure apple juice or a water solution of apple juice depending on the flavor of the canned product desired. While the fruit is in this bath, it holds substantially all of its soluble contents and any liquid absorbed by the fruit partakes of the flavor of the fruit. Furthermore, the fruit juice bath has a decided brightening effect on the color of the apple, producing a better product. The temperature of the color fixing bath may be from 50 to 140 degrees Fahrenheit and the fruit may be held therein for a period of one minute to twenty-four hours.

After passing from the color fixing bath the fruit is heated and washed prior to being introduced into the cans. This heating and washing may be effected by contact of the fruit with a liquid either in the form of a spray or a bath. The heated liquid wash may be either pure apple juice or a water solution of apple juice of any desired juice content. The more juice the better the flavor and the color of the canned product. The temperature of the heated liquid wash may vary from 110 degrees Fahrenheit to boiling and the duration thereof may be from one minute to twenty-four hours, but should be continued until the pieces are free from salt.

After the washing the pieces are placed in their containers and preferably a hot boiling liquid poured into the container to insure that the latter shall be filled before sealing. This final liquid may be either pure apple juice or a water solution of apple juice of any desired content.

The containers are now sealed under the usual conditions and cooked say from fifteen to forty-five minutes.

It will be understood that the canning process varies throughout with the variety, maturity and other conditions of the original fruit. During the whole process the fruit is treated so as not to remove any of the soluble contents nor to saturate the same with a tasteless liquid such as water. The invention makes it possible to produce canned apple products which have a natural flavor and are free from a dead taste due to the incorporation of a tasteless liquid therein during the canning process.

What I claim as my invention and desire to secure by Letters Patent is:

1. The method of canning apple products which comprises subjecting the fruit during the canning process and prior to canning to a salt bath containing apple juice to toughen the apples so they can be handled and to brighten the color of the fruit and hold all the soluble contents thereof, thereafter washing salt from the fruit thus treated by subjecting the fruit to a bath containing apple juice, placing the fruit thus washed into a container, adding liquid containing apple juice to fill the container, and finally sealing the container.

2. The method of canning apple products which comprises subjecting the fruit during the canning process and prior to canning to a salt bath containing apple juice to toughen the apples so they can be handled and to brighten the color of the fruit and hold all the soluble contents thereof, thereafter washing salt from the fruit thus treated by subjecting the fruit to a bath containing apple juice, placing the fruit thus washed into a container, and finally sealing the container.

LINCOLN CHARLES MAZZOLA.